United States Patent
Boutevin et al.

(10) Patent No.: US 9,416,218 B2
(45) Date of Patent: Aug. 16, 2016

(54) METHODS FOR PRODUCING THERMOSETTING EPOXY RESINS

(75) Inventors: Bernard Boutevin, Montpellier (FR); Sylvain Caillol, Montpellier (FR); Carine Burguiere, Castries (FR); Sylvie Rapior, Montpellier (FR); Hélène Fulcrand, Saint Gely du Fesc (FR); Hélène Nouailhas, Montpellier (FR)

(73) Assignees: CENTRE NATIONAL DE LA RECHERCHE SCIENTIFIQUE (C.N.R.S.), Paris (FR); ECOLE NATIONALE SUPERIEURE DE CHIMIE DE MONTPELLIER, Montpellier (FR)

( * ) Notice: Subject to any disclaimer, the term of this patent is extended or adjusted under 35 U.S.C. 154(b) by 299 days.

(21) Appl. No.: 13/322,320

(22) PCT Filed: May 27, 2010

(86) PCT No.: PCT/FR2010/051018
§ 371 (c)(1), (2), (4) Date: Mar. 14, 2012

(87) PCT Pub. No.: WO2010/136725
PCT Pub. Date: Dec. 2, 2010

(65) Prior Publication Data
US 2012/0165429 A1 Jun. 28, 2012

(30) Foreign Application Priority Data

May 27, 2009 (FR) .................................... 09 02589

(51) Int. Cl.

| | |
|---|---|
| C08G 59/06 | (2006.01) |
| C08G 59/02 | (2006.01) |
| C08G 59/17 | (2006.01) |
| C08G 59/42 | (2006.01) |
| C08G 59/50 | (2006.01) |
| C08L 63/00 | (2006.01) |

(52) U.S. Cl.
CPC ............ *C08G 59/063* (2013.01); *C08G 59/022* (2013.01); *C08G 59/027* (2013.01); *C08G 59/1466* (2013.01); *C08G 59/42* (2013.01); *C08G 59/50* (2013.01); *C08L 63/00* (2013.01)

(58) Field of Classification Search
None
See application file for complete search history.

(56) References Cited

U.S. PATENT DOCUMENTS

| | | | | |
|---|---|---|---|---|
| 2,892,849 | A | * | 6/1959 | St. Clair .................. 549/517 |
| 3,984,363 | A | | 10/1976 | D'Alelio |
| 4,435,529 | A | * | 3/1984 | Kaylo et al. .................. 523/426 |
| 4,540,802 | A | | 9/1985 | Tomita et al. |
| 2003/0099839 | A1 | | 5/2003 | Hwang et al. |
| 2010/0255315 | A1 | * | 10/2010 | Okabe et al. .................. 428/418 |

FOREIGN PATENT DOCUMENTS

| | | | |
|---|---|---|---|
| EP | 0095609 | A1 | 12/1983 |
| EP | 161 576 | A2 | 11/1985 |
| EP | 0739877 | | 10/1996 |
| GB | 1263204 | A * | 4/1972 |
| JP | S58-210078 | A | 12/1983 |
| JP | 59-210017 | A * | 11/1984 |
| JP | S61-152774 | A | 7/1986 |
| JP | H02-110116 | A | 4/1990 |
| JP | 3-161411 | A * | 7/1991 |
| JP | 3 161411 | A | 7/1991 |
| JP | H10-218973 | A | 8/1998 |
| JP | 2002-363256 | A | 12/2002 |
| JP | 2003-073448 | A | 3/2003 |
| JP | 2006-307141 | A | 11/2006 |
| JP | 2009-084320 | A | 4/2009 |
| JP | 2009-209117 | A * | 9/2009 |
| JP | 2010-241855 | A | 10/2010 |
| JP | 2011-032493 | A | 2/2011 |
| SU | 1682362 | A1 * | 10/1991 |

OTHER PUBLICATIONS

Wu et al., "Flavones. 2. Synthesis and Structure-Activity Relationship of Flavodilol and Its Analogues, a Novel Class of Antihypertensive Agents with Catecholamine Depleting Properties," Journal of Medicinal Chemistry, vol. 32, 1989, pp. 183-192.*
Chemical Book, 5-hydroxycoumarin, 2014, one page.*
Industrial Crops and Products, Publication III, Kemppainen et al., "Spruce bark as an industrial source of condensed tannins and non-cellulosic sugars," 2014, 13 pages.*
Database WPI Week 199134 Thomson Scientific, London, GB; AN 1991-248667 & JP 3-161411 (1991).
Oyanguren et al., "Analysis of the epoxidation of a bisphenol A and phenolic Novolacs with epichlorohydrin," *Polymer*, 33(11): 2376-2381 (1992).
Int'l Search Report & Written Opinion issued in app. No. PCT/FR2010/051018 (2010).
Kishi, H. et al. 2006 "Synthesis of wood-based epoxy resins and their mechanical and adhesive properties" Journal of Applied Polymer Science 102: 2285-2292.
Roffael, E. et al. "Use of spruce tannin as a binder in particleboards and medium density figerboards (MDF)" *Holz als Roh und Werkstoff* 58(5): 301-305.
Oyanguren, P.A. and Williams, R.J.J. 1992 "Analysis of the epoxidation of bisphenol A and phenolic Novalacs with epichlorohydrin" *Polymer* 33(11): 2376-2381.

* cited by examiner

*Primary Examiner* — Robert Sellers
(74) *Attorney, Agent, or Firm* — Knobbe, Martens Olson & Bear, LLP (57) ABSTRACT

The present application relates to a method for preparing epoxy resins from a mixture of epoxidized phenolic compounds, wherein said epoxidized phenolic compounds are obtained by the epoxidation of natural phenolic compounds selected from the group comprising simple phenol, acid-phenol, coumarin, naphthoquinone, stillbenoid, flavonoid, isoflavanoid, anthocyanin, condensed tannin and hydrolyzable tannin.

8 Claims, 7 Drawing Sheets

Fig. 1: IR spectra of natural catechin and of epoxidized catechin

Fig. 2: ESI-TOF spectra of natural catechin and of epoxidized catechin

Fig. 3: 1H-NMR spectrum of natural catechin

Fig. 4: 1H-NMR spectrum of epoxidized catechin

Fig. 5: 1H Dosy spectra of natural catechin (A) and of epoxidized catechin (B)

Fig. 6: Mass losses of resins A, B and C obtained by TGA

Fig. 7: Thermograms of resins A, B and C obtained by DSC

METHODS FOR PRODUCING THERMOSETTING EPOXY RESINS

CROSS REFERENCE TO RELATED APPLICATIONS

This application is a U.S. nationalization under 35 U.S.C. §371 of International Application No. PCT/FR2010/051018, filed May 27, 2010, which claims priority to French application no. FR 0902589, filed May 27, 2009. The disclosures set forth in the referenced applications are incorporated herein by reference in their entireties.

The field of the present invention is that of the synthesis of epoxy prepolymers, notably of the glycidyl ether type and of their use for producing epoxy resins. The present invention more particularly relates to the use of polyfunctional aromatic and polyaromatic compounds derived from renewable resources, and not derived from oil, natural gas, coal or other fossil resources, as reagents for the synthesis of glycidyl ethers and to their use for producing resins and more specifically resins of the thermosetting epoxy type.

Within the scope of the present description, by « epoxy prepolymer » is meant a compound or a mixture of compounds including one or more epoxide functions. These prepolymers are typically glycidyl ethers bearing terminal epoxide functions.

Epoxy prepolymers are generally reacted by formulation with hardeners or monomers for forming resins, so-called « epoxy type resins » or « epoxy resins ». Particular epoxy type resins are « thermosetting resins of the epoxy type » or « epoxy thermosetting resins » which are a mixture of epoxy prepolymers and of a hardener. Another type of resin of the epoxy type is a « vinyl ester resin » which is obtained by reaction of a mixture of epoxy prepolymers with acrylic or methacrylic acid in order to obtain an acrylate or methacrylate macromonomer, and then by polymerization of this macromonomer with vinyl monomers.

Within the scope of the invention, by « epoxide » is meant a function including an oxygen atom bridged on a carbon-carbon bond. By extension a compound including an epoxide function is also called an epoxide or « oxirane » or further « epoxy ». By « epoxidation » is meant a reaction aiming at introducing an epoxide function into a compound, for example by oxidation of an olefin or by nucleophilic substitution of a halogenated oxirane. Epichlorhydrin is also generally used for introducing epoxide functions (more specifically glycidyl ether) on phenolic compounds.

Within the scope of the present description by « formulation » is meant the action of mixing epoxy prepolymers with a hardener. Both of these components react together, typically by polymerization, in order to form an epoxy resin or a cross-linked resin. This is also referred as « cross-linking ».

Within the scope of the present description, by « epoxy type resin » or « epoxy resin » is meant the result of the formulation of a mixture of epoxy prepolymers with a hardener.

The object of the present application is a method for preparing epoxy prepolymers, epoxy thermosetting resins and vinyl ester resins obtained from natural phenolic compounds. Another object is also epoxy prepolymers, epoxy thermosetting resins and vinyl ester resins prepared by said method, as well as the use of said resins.

Epoxidation of polyfunctional aromatic and polyaromatic compounds has the purpose of modifying their reactivity upon the formulation of epoxy resins and of thereby controlling the setting time of the resin or the pot-life. These aromatic and polyaromatic compounds are natural phenolic compounds derived from biomass and more particularly from extracts of plants, trees, vine, fruit or algae.

By their versatility, their ease of use and their varied physical properties, resins of the epoxy type are used in many plastic materials, particularly in the field of electronic applications, such as the insulation of transformers, of switches, of circuit breakers. Resins of the epoxy type also have excellent mechanical and electrical, temperature stability and friction properties, resistance to chemical products and are well known as protective coatings on metal surfaces.

The first function of the hardeners is to react with the epoxides in the formulation in order to propagate the cross-linking of the resin. Formulations of epoxy resins may also contain catalysts (accelerators) for catalyzing the cross-linking reaction, as well as additives, fillers, plasticizers, diluents, reagents, stabilizers and other ingredients.

The epoxy resins consist of two components which react together in order to form a cross-linked resin with remarkable mechanical and thermal properties. This reaction occurs between a prepolymer which is a compound bearing epoxy functions (glycidyl) and a hardener. The hardener is a compound bearing amine (primary and optionally secondary amine) functions or bearing acid or acid anhydride functions. This reaction takes place at room temperature or under hot conditions and is exothermic (Scheme 1). The hardening may also be obtained by radical polymerization with vinyl monomers after addition of the prepolymer and of acrylic or methacrylic acid. The cross-linking is then based on the copolymerization of vinyl monomers and of acrylate macro monomers.

Scheme 1: cross-linking mechanism of epoxy resins with amine hardeners.

The compounds with epoxy functions or epoxy prepolymers are generally synthesized from bisphenol A and from epichlorohydrin; these are oligomers of DiGlycidylEther Bisphenol A (DGEBA) (Scheme 2). Bisphenol A is a noxious product classified as a reprotoxic CMR of Category 3.

Scheme 2: synthesis reaction of oligomers of DGEBA

Amine hardeners used in epoxy resins generally consist of compounds bearing primary and secondary amine functions. The amine functions react with the epoxy functions during the cross-linking (Scheme 1). The primary amine functions are more reactive and the rise in temperature consecutive to the exothermy of the reaction with the epoxy functions gives the possibility of providing the energy required for the reaction of the secondary amine functions.

The most used diamines are methylenedianiline (MDA) and diaminodiphenylsulfone (DDS) (Scheme 3, Scheme 4). However DDS is a noxious compound and DMA is classified as a CMR: a carcinogen of category 2 and a mutagen of category 3. Their uses are therefore highly dangerous and should be limited, or even avoided.

Scheme 3: MethyleneDiAniline, CMR

Scheme 4: Diamino Diphenyl Sulfone

Other amines are also used in the formulations of epoxy resins such as isophorone diamine and N-aminoethyl piperazine, but these amines are noxious by contact and ingestion, sensitizing, toxic for the environment (Scheme 5, Scheme 6).

Scheme 5: isophorone diamine

Scheme 6: N-aminoethyl piperazine

The acid hardeners used in epoxy resins generally consist of compounds bearing acid or acid anhydride functions. The hydroxyl functions borne by the epoxy prepolymers react with the anhydride functions which release an acid group which may react with a glycidyl group during the cross-linking (Scheme 7). The anhydride functions are less reactive than the amine functions and a sufficient amount of heat energy has to be brought in order to initiate cross-linking.

Scheme 7: cross-linking mechanism of epoxy resins with anhydride hardeners

The most used anhydride hardeners are phthalic anhydride and its derivatives (Scheme 8, Scheme 9).

Scheme 8: phthalic anhydride

Scheme 9: methyl tetrahydrophthalic anhydrides

The preparation of vinyl ester resins is carried out in two phases. First, the epoxy prepolymers are formed by reaction with acrylic or methacrylic acid so as to synthesize an acrylate or methacrylate macromonomer. Next, this macromonomer is copolymerized by radical polymerization with vinyl monomers (styrene, vinyl toluene or their derivatives) by radical polymerization, initiated with a radical initiator, via a thermal, photochemical or radiative route (Scheme 10).

Scheme 10: mechanism for producing vinyl ester resins

-continued

At the present time, industrialists of the chemical industry have to react, confronted with several constraints for their activities:

scarcity of fossil raw materials accompanied by price volatility;

requirement for a drastic reduction in the pollution of chemical processes and in particular in the release of greenhouse gases;

strong regulatory pressure relating to the toxicological aspects of the raw materials and synthesis intermediates with the regulations (REACH, DCE . . . ).

Confronted with these constraints, the chemical industry has to continue to meet the expectations of society with products and alternative processes more respectful of humans and of its environment, in particular by producing materials from renewable resources. And orientation of chemistry towards the use of renewable resources, provides it with two important missions: replace fossil resources with renewable resources in order to limit the constraint which lays a burden on oil and to reduce fossil carbon emissions produced due to oxidation of fossil resources; replace toxic substances which are a concern for humans. This is why it is not sufficient to content oneself with substituting molecule for molecule (the possible toxicity is retained) but with also contemplating substitution of properties obtained from a material with identical (or even improved) properties with novel materials derived from renewable resources.

Presently the great challenges related to obtaining synthons derived from biomass are to replace industrial resins and composites. As regards the technical specifications which are desirably obtained for accessing epoxy thermosetting resins, they are particularly demanding and notably comprise the following specifications:

1—The first sought specification would be that thermosetting resins be resins based on epoxy prepolymers in order to allow great reactivity of the cross-linking phase.

2—The second sought specification would be that the thermosetting resins and the vinyl ester resins be produced from aromatic or polyaromatic compounds derived from renewable resources and not derived from oil, natural gas, coal or other fossil resources.

3—The third sought specification would be that the functionalization and epoxidation reactions apply reagents preferentially derived from renewable resources and not derived from oil, natural gas, coal or other fossil resources.

4—The fourth sought specification would be that the epoxidized aromatic and polyaromatic compounds be able to be applied in epoxy and vinyl ester resins under suitable processability conditions (melting temperature, viscosity, solubility . . . ).

5—The fifth sought specification would be that the epoxidized aromatic and polyaromatic compounds be sufficiently reactive in order to apply cross-linking reactions under acceptable conditions (temperature, duration . . . )

The prior technical proposals, described infra have attempted to meet some of these challenges. As an illustration, mention may notably be made of the following prior proposals:

(a) U.S. Pat. No. 3,984,363 relates to the esterification of epoxidized lignins and to the use of these esterified lignins in compositions of epoxy thermosetting resins also comprising a cross-linking agent, of the acid anhydride or amine type. This patent exclusively relates to lignins, complex phenolic compounds and not very soluble. In order to make them more soluble, these compounds are therefore necessarily transformed by an esterification step with carboxylic acids bearing fatty chains having from 1 to 20 carbon atoms.

(b) A synthesis of resorcinol diglycidyl ether (Scheme 11) from resorcinol and of epichlorohydrin is described in U.S. Pat. No. 2,892,849.

Scheme 11: resorcinol diglycidyl ether (c) A synthesis of phloroglucinol triglycidyl ether (Scheme 12) from phloroglucinol and epichlorohydrin as well as its antitumoral activity are described in the abstract of JP59210017.

Scheme 12: phloroglucinol triglycidyl ether

An aim of the present invention is to provide ways for producing epoxy thermosetting resins derived from renewable resources.

Another aim of the present invention is to provide novel ways for producing vinyl ester resins derived from renewable resources.

Another aim of the present invention is to obtain novel epoxidized aromatic and polyaromatic compounds derived from renewable resources, which are miscible and may be formulated with amine hardeners under the usual conditions for formulation and cross-linking, and which preferably give the possibility of controlling the cross-linking of the epoxy resins produced from their formulation.

The aims relating to the product are achieved by the present invention which provides a route for the synthesis of polyfunctional aromatic or polyaromatic compounds from natural phenolic compounds, notably derived from plant biomass, or from related products derived from forestry, or extracted from freshwater or halophilic algae, or extracts of vine, grape, fruit or related products from wine growing or wine making.

Another aim of the invention is to provide novel methods for producing epoxy thermosetting resins derived from renewable resources, and in particular allow replacement of phenolic compounds of fossil origin with phenolic compounds of natural origin.

Another aim of the invention is to control the cross-linking of the epoxy resins produced according to the aforementioned methods.

More specifically, the object of the invention is a method for producing resins of the epoxy type, notably epoxy or vinyl ester thermosetting resins obtained from natural phenolic compounds.

According to a first aspect, the object of the invention is a method for preparing resins of the epoxy type from a mixture of epoxidized phenolic compounds, where said epoxidized phenolic compounds are obtained by epoxidation of natural phenolic compounds selected from the group consisting of simple phenol, acid-phenol, coumarin, naphthquinone, stillbenoid, flavonoid, isoflavonoid, anthocyanin, condensed tannin and hydrolyzable tannin (tannins are generally used in a depolymerized form).

These compounds may be used as a mixture and this is typically the case when natural compounds are used, derived from plant biomass.

This epoxidation step leads to epoxidized phenolic compounds used for preparing resins. In other words, the method according to the invention applies epoxidized phenolic compounds which are derived from epoxidation of natural phenolic compounds.

According to a first alternative, the prepared resin is an epoxy thermosetting resin and is prepared by formulating said mixture of epoxidized phenolic compounds with at least one hardener bearing free amine or acid anhydride functions, whereby the epoxy thermosetting resin is obtained.

According to a second alternative, the prepared resin is a vinyl ester resin and is prepared according to a method also comprising the following subsequent steps:
  a step for reacting the mixture of epoxidized phenolic compounds with acrylic or methacrylic acid, whereby an acrylate or methacrylate macromonomer is obtained,
  a step for copolymerizing said acrylate or methacrylate macromonomer with vinyl monomers, preferably by radical polymerization,
whereby the vinyl ester resin is obtained.

The epoxy prepolymers are reacted with acrylic, methacrylic acid or a derivative in order to synthesize an acrylate or methacrylate macromonomer. The reaction is carried out by reacting epoxidized natural phenolic compounds with acrylic or methacrylic acid, preferably with acrylic acid. This reaction is carried out in a solvent and allows isolation of an acrylate or methacrylate macromonomer. This macromonomer then enters a reaction with a reactive diluent, a polymerizable solvent consisting of vinyl compounds, preferably styrene or vinyl toluene.

The epoxidized phenolic compounds used as reagents in the method of the invention are derived from natural phenolic compounds which are generally subdivided into simple phenols, acid-phenols (derivatives of benzoic or cinnamic acid) and coumarins, in naphthoquinones, stilbenoids (two $C_6$ rings bound through 2C), in flavenoids, isoflavonoids and anthocyanins ($C_5$-$C_3$-$C_6$ structure) and in polymerized forms: condensed tannins and hydrolyzable tannins. These carbon backbones are derived from the secondary metabolism of plants, produced the via the shikimate route. These are molecules which contain at least one benzene ring and hydroxyl groups.

Typically, these hydroxyl groups are located on the benzene rings, thereby forming phenol functions. Natural phenolic compounds are also designated as « polyphenols ».

The natural phenolic compounds used according to the invention have the advantage of comprising hydroxy functions in varied positions, which gives the possibility of obtaining epoxidized compounds with variable functionality (in number and in position). This change in the epoxidation level allows control of the functionality and therefore of the reactivity, and consequently, the cross-linking time and in this way the final mechanical properties of the material after hardening.

The reagents applied in the method of the invention are generally free of natural phenolic compounds other than those mentioned earlier. In particular, they are preferably free of lignins and lignans.

Examples of natural phenolic compounds which may be used according to the invention are listed in the following table, which also indicates a possible origin for each class of compounds.

| PHENOLIC COMPOUNDS | | | | |
|---|---|---|---|---|
| Carbon backbone | Class | Example | Formula | Origin |
| C6 | Simple phenols | Hydroquinon | | Bearberry |
| C6 | Simple phenols | Resorcinol | | Wood |
| C6 | Simple phenols | Phloroglucinol | | Brown algae |
| C6-C1 | Hydroxybenzoic acids | P-hydroxybenzoic acid | | Spices, strawberries |
| C6-C1 | Hydroxybenzoic acids | Gallic acid | | Grapes |
| C6-C3 | Hydroxycinnamic acids | P-coumaric acid | | Tomatoes, garlic |
| | Coumarins | Ombelliferone | | Carrots, coriander |
| C6-C4 | Naphthoquinones | Juglone | | Walnuts |

-continued

| Carbon backbone | Class | Example | Formula | Origin |
|---|---|---|---|---|
| C6-C2-C6 | Stillbenoids | trans-Resveratrol | | Grapes |
| C6-C3-C6 | Flavonoids | Kaempferol | | Strawberries |
| | Isoflavonoids | Daidzein | | Soya beans |
| | Anthocyanins | Delphinidol | | Cabernet-Sauvignon Grapes |
| (C6-C3-C6)$_n$ | Condensed tannins | Procyanidin | | Apples |

PHENOLIC COMPOUNDS

| Carbon backbone | Class | Example | Formula | Origin |
|---|---|---|---|---|
| | Hydrolyzable tannins | Gallotannins |  | Oak |

This table is inspired from Macheix et al. in Sarni-Manchado and Cheynier (Les polyphénols en agroalimentaire, Lavoisier, Editions Tec & Doc, 2006, p. 398), as well as from Bruneton (Pharmacognosie-Phytochimie, Plantes médicinales, Editions Tec & Doc, Editions médicales internationales, 1999, p. 1120) but is not exhaustive and is not limiting as regards the phenols which may be used.

According to a preferred embodiment, the natural phenolic compounds are of the type: flavonoid, condensed tannin or hydrolyzable tannin, and are preferably selected from catechin (Scheme 13) and derivatives of catechin. Advantageously, the natural phenolic compounds are selected from catechin, epicatechin, gallocatechin, epiogallocatechin, catechin gallate, epicatechin gallate, etc.

Scheme 13: Structure of catechin

According to a preferred embodiment, said natural phenolic compounds are extracted:
  from wood, or related products from forestry,
  freshwater or halophilic algae, or
  from vine, grape, fruit or related products from wine growing or wine making.

Within the scope of the present description, by « flavonoids » is meant a class of organic compounds having a backbone with 15 carbon atoms, made with two $C_6$ rings connected through a $C_3$ chain. Flavonoids notably encompass flavons, flavonols, flavonols (also called catechins).

Within the scope of the present description, by « condensed tannins » is meant a class of organic compounds derived from polymerization of flavonoids. Condensed tannins are also called « catechin tannins » or « proanthocyanidins ».

Within the scope of the present description, by « hydrolyzable tannins » is meant a class of organic compounds derived from the polymerization of a sugar and of acid-phenols.

The polymerized forms of natural phenolic compounds are depolymerized before epoxidation. In particular, condensed tannins (or proanthocyanidins) are hot depolymerized in an alcohol medium in the presence of an acid and a nucleophilic reagent (Kolodziej Phytochemistry; 1990, 29, 1671-1674; Rigaud, J.; Perez-Ilzarbe, X.; Ricardo da Silva, J. M.; Cheynier, V. Journal of Chromatography; 1991, 540, 401-405; Guyot, S.; Marnet, N.; Laraba, D.; Sanoner, P.; Drilleau, J. F. Journal of Agricultural and Food Chemistry; 1998, 46, 1698-1705; Kennedy, J.; Jones, G. P. Journal of Agricultural and Food Chemistry; 2001, 49, 1740-1746; Torres, J.; Lozano, C. Chromatographia; 2001, 54, 523-526). This nucleophilic reagent reacts with the upper units and extension units which have been released in the form of carbocations by acido-catalyzed breaking of the interfiavan bonds (Scheme 14). The nucleophilic reagent is a compound having a thiol function, i.e. a monoaromatic compound. Thus, the constitutive units of the polymeric chains after depolymerization reaction are again found either as free monomers when they were initially in the terminal position (lower end), or as substituted monomers (thioether derivatives or phenolic compound derivative) when they were initially in the intermediate position or upper end position.

Scheme 14: Illustration of the reaction for depolymerizing condensed tannins.

When depolymerization is carried out with a phenolic compound such as resorcinol, additional hydroxy functions are introduced on all the substituted monomeric units which increase the epoxidation degree by that much.

Thus, according to a particular embodiment, notably well adapted to condensed tannins and to hydrolyzable tannins, the method according to the invention comprises, prior to the epoxidation step, a step for depolymerization of natural phenolic compounds when the latter are present in polymerized form. This depolymerization is typically carried out in the presence of an acid and of nucleophilic reagents.

According to this embodiment, the polymerized forms of phenolic compounds are depolymerized before epodixation. The nucleophilic reagent is generally a compound having a thiol function (such as toluene α-thiol, thioglycolic acid, cystein or cysteamine) or further a mono-aromatic phenolic compound (typically phloroglucinol or resorcinol).

The epoxidation reaction of the method according to the invention may advantageously be carried out according to either one of the following embodiments.

According to a first embodiment, the epoxidation of the natural phenolic compounds is carried out by epoxidation by an oxirane substituted with at least one chlorine or bromine atom, preferably with epichlorohydrin.

Epoxidation is generally conducted in a solvent such as ethanol, preferably absolute ethanol. This epoxidation is advantageously carried out in the presence of a strong base, typically soda. The formed salt is generally removed by filtration and the residual oxirane may be removed by evaporation.

An advantage of this embodiment is the use for epoxidation polyphenolic compounds of epichlorohydrin which stems from a renewable resource, since it is obtained by chlorination of the glycerol co-produced from the transesterification of plant oils for preparing bio-diesel.

According to a second embodiment, epoxidation of the natural phenolic compounds is carried out by alkylating the natural phenolic compounds with an unsaturated halide and then by oxidizing the thereby alkylated compounds.

The alkylation step is typically conducted by phase transfer catalysis by in aqueous phase, methanol phase or in a water/methanol mixture in variable proportions. The alkylation of the natural phenolic compounds is advantageously carried out by reacting the natural phenolic compounds with an alkene halide, preferentially an allyl halide, and more preferentially allyl bromide. The phase transfer catalyst used is preferably a quarternary ammonium salt, preferentially a tetraalkylammonium sulfate and more preferentially tetrabutylammonium hydrogensulfate.

The alkylation is generally followed by oxidation of the ethylenic functions borne by the natural phenolic compounds after alkylation. This oxidation is advantageously conducted with peroxides such as hydrogen peroxide or with peroxycarboxylic acids, preferentially peroxyacetic acid, peroxybenzoic acid, peroxytrifluoroacetic acid or meta-chloroperbenzoic acid. This oxidation may also be achieved enzymatically.

The epoxidation route used according to the invention allows functionalization of the non-purified natural phenolic compounds after extraction, further with the obtained compounds, it is possible to produce without any other post-treatment epoxy thermosetting resins.

The invention relates to the formulation of these epoxidized natural phenolic compounds with hardeners including free amine or acid anhydride functions. The formulation of the epoxidized natural phenolic compounds with amine hardeners leads to the production of epoxy-amine resins. The formulation of the epoxidized natural phenolic compounds with hardeners bearing acid anhydride functions leads to the production of epoxy-anhydride resins.

According to a second aspect, the object of the invention is also epoxy resins of the type obtained according to the method defined earlier.

In particular, the invention also relates to an epoxy resin which may be obtained according to the aforementioned preparation method, from a mixture of epoxidized phenolic compounds, themselves obtained from a mixture of natural, crude, and/or depolymerized phenolic compounds.

The invention also relates to an epoxy thermosetting resin which may be obtained according to the aforementioned preparation method.

According to a particular embodiment of the invention, the aforementioned resin is a resin of the epoxy-amine type.

According to a particular embodiment of the invention, the aforementioned resin is a resin of the epoxy-acid anhydride.

The hardeners of the amine type and of the acid type are generally of the type of those mentioned earlier.

The invention also relates to a vinyl ester resin which may be obtained according to the aforementioned preparation method.

The invention also relates to the use of an epoxy thermosetting resin or a vinyl ester resin which may be obtained by the method according to the invention for obtaining composite materials, for isolation of electronic components and for the coating of surfaces, notably metal surfaces.

FIGURES

FIG. 5 shows the Dosy$^1$H spectra of natural catechin and of the epoxidized catechin according to Example 1.

The invention will further be more illustrated considering the examples described hereafter.

EXAMPLES

The following examples are used for illustrating the invention without limiting the scope thereof in any way.

Example 1

Synthesis of an Epoxidized Catechin by Epoxidation of Catechin with Epichlorohydrin (Scheme 15)

Scheme 15: Synthesis scheme for epoxidized catechin

R = H ou CH$_2$—[epoxide]

The catechin is weighed (0.5 g, $1.72.10^{-3}$ mol, Sigma C1251-10G), solubilized in ethanol (3 mL) and introduced into a two-neck 50 mL flask. The epichlorohydrin (2.7 mL, $3.44.10^{-2}$ mol, Aldrich 240699-100 mL) is introduced into the flask placed with magnetic stirring for a few minutes at 98° C. The reaction mixture is refluxed and an alcoholic solution of soda (0.70 g, $1.75.10^{-2}$ mol) in ethanol (6.5 mL) is added dropwise. The reaction medium is then left with refluxing. After 3 hours of reaction, the reaction medium is diluted in acetone (100 mL) and filtered on a filter with glass microfibers (1 μm) for removing the formed NaCl. The filtrate is then concentrated in the rotary evaporator in vacuo in order to remove the residual epichlorohydrin. The product is in the form of an oil which is dissolved in acetone (15 mL), again filtered and concentrated in the rotary evaporator in vacuo. The dissolution-filtration-evaporation operation is then repeated one last time.

Example 2

Synthesis of an Epoxidized Catechin by Epoxidation of Catechin Through Alkylation/Oxidation The catechin is weighed (0.5 g, $1.72.10^{-3}$ mol, Sigma C1251-10G), solubilized in THF (3 mL) and introduced into a two-neck 50 mL flask. The allyl bromide is weighed (0.2 g, $1.72.10^{-3}$ mol) and introduced into the flask placed with magnetic stirring. The tetrabutyl ammonium hydrogensulfate catalyst is weighed (0.1% w/w) and introduced into the flask. The reaction mixture is refluxed for one hour. The reaction medium is then cooled. Catechin allyl ether is obtained by extraction. The product of the reaction is then solubilized and introduced into a three-neck flask surmounted with a condenser and equipped with magnetic stirring. 0.1% w/w of tricapryl methyl ammonium chloride, 40 ml of distilled water, 0.1% w/w of $Na_2WO_4.2H_2O$ and 0.1% w/w of $H_3PO_4$ and 10 g of $H_2O_2$ at 20 volumes are added. The reaction mixture is brought to 70° C. for 45 mins and then cooled. The tetraepoxidized catechin is obtained.

Example 3

Syntheses of Epoxidized Phenolic Compounds by Epoxidation with Epichlorohydrin

The following syntheses were carried out under the same conditions as those described in Example 1. The amounts of reagents used for the different syntheses are summarized in Table 2.

- Synthesis of an epoxidized epicatechin by epoxidation of epicatechin
- Synthesis of an epoxidized gallocatechin by epoxidation of gallocatechin (Scheme 16)
- Synthesis of an epoxidized epigallocatechin by epoxidation of epigallocatechin
- Synthesis of an epoxidized catechin gallate by epoxidation of catechin gallate
- Synthesis of an epoxidized epicatechin gallate by epoxidation of epicatechin gallate.

Scheme 16: Scheme for the synthesis of epoxidized gallocatechin

TABLE 2

Amounts of materials for the syntheses of epoxidized model molecules

| Polyphenol | Amount | Epichlorohydrin | Soda |
|---|---|---|---|
| Epicatechin | 0.5 g, $1.72 \cdot 10^{-3}$ mol | 2.7 mL, $3.44 \cdot 10^{-2}$ mol | 0.70 g, $1.75 \cdot 10^{-2}$ mol |
| Gallocatechin | 0.5 g, $1.63 \cdot 10^{-3}$ mol | 3.1 mL, $3.92 \cdot 10^{-2}$ mol | 0.78 g, $1.96 \cdot 10^{-2}$ mol |
| Epigallocatechin | 0.5 g, $1.63 \cdot 10^{-3}$ mol | 3.1 mL, $3.92 \cdot 10^{-2}$ mol | 0.78 g, $1.96 \cdot 10^{-2}$ mol |
| Catechin gallate | 0.5 g, $1.13 \cdot 10^{-3}$ mol | 2.5 mL, $3.16 \cdot 10^{-2}$ mol | 0.63 g, $1.58 \cdot 10^{-2}$ mol |
| Epicatechin gallate | 0.5 g, $1.13 \cdot 10^{-3}$ mol | 2.5 mL, $3.16 \cdot 10^{-2}$ mol | 0.63 g, $1.58 \cdot 10^{-2}$ mol |

Example 4

Figure 1:
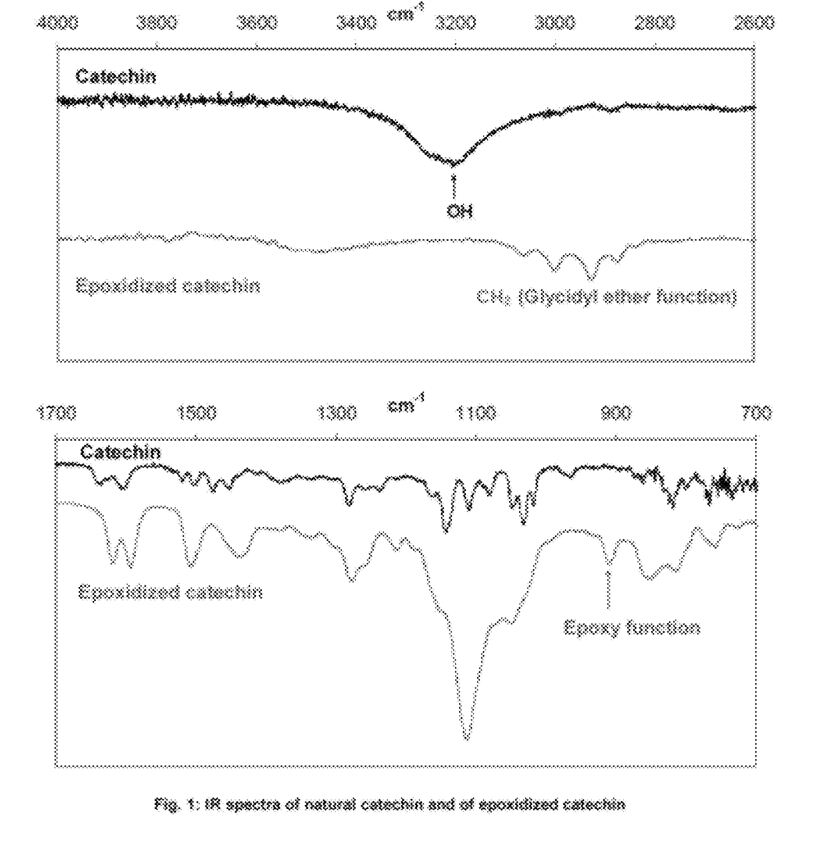
FIG. 1 shows the IR spectra of natural catechin and of epoxidized catechin according to Example 1.

Characterization of the Epoxidized Molecules
By Infra-Red: FIG. 1

The band centered on 3,200 $cm^{-1}$, which is a characteristic of —OH functions of natural catechin, disappears on the spectrum of the epoxidized catechin. In this area, the occurrence of peaks corresponding to the $CH_2$ present in the glycidyl ether functions shows epoxidation of catechin.

Further, on the spectrum of epoxidized catechin, the occurrence of a peak towards 900 $cm^{-1}$ is seen, which is a characteristic of epoxide functions.

Figure 2:
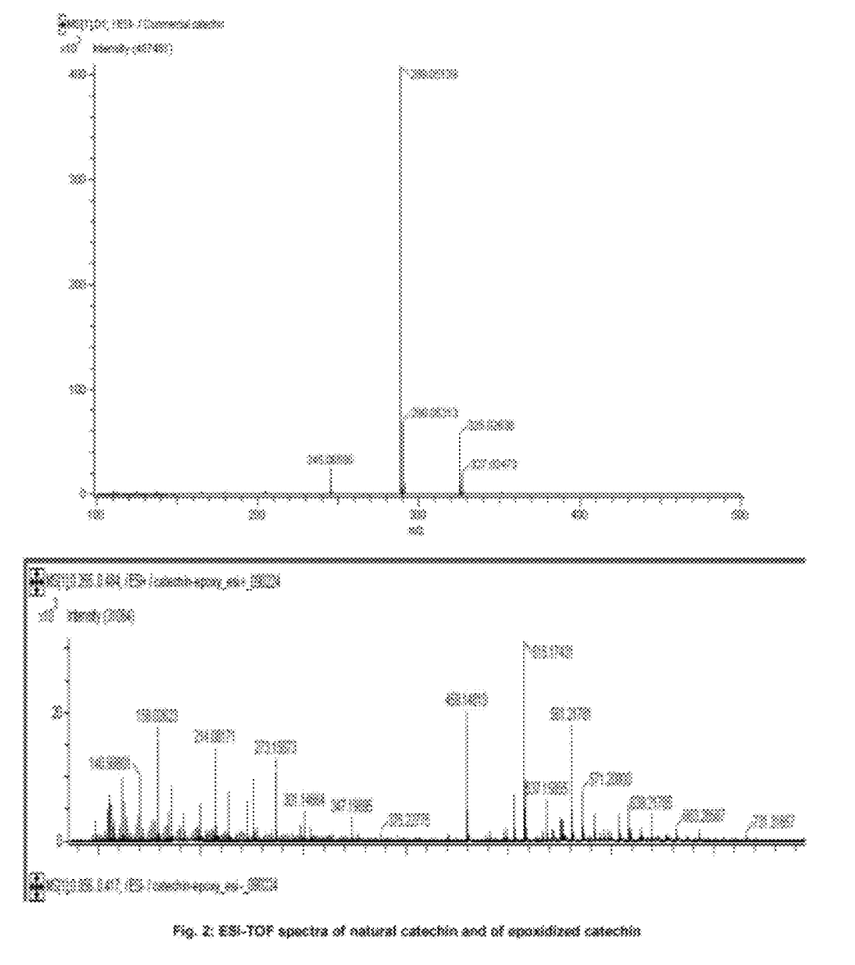
FIG. 2 shows the ESI-TOF spectra of natural catechin and of epoxidized catechin according to Example 1.

By ESI-TOF: FIG. 2

The spectrum of natural catechin essentially comprises the peak corresponding to catechin at 290 g/mol.

On the spectrum of epoxidized catechin, many peaks are again found, corresponding to, catechin molecules bearing one, three, four or five glycidyl ether functions:
- 347 g/mol: epoxidized catechin with one glycidyl ether function
- 459 g/mol: epoxidized catechin with three glycidyl ether functions
- 515 g/mol: epoxidized catechin with four glycidyl ether functions+a sodium adduct at 537 mol (514+23)
- 571 g/mol: epoxidized catechin with five glycidyl ether functions.

Figure 3:
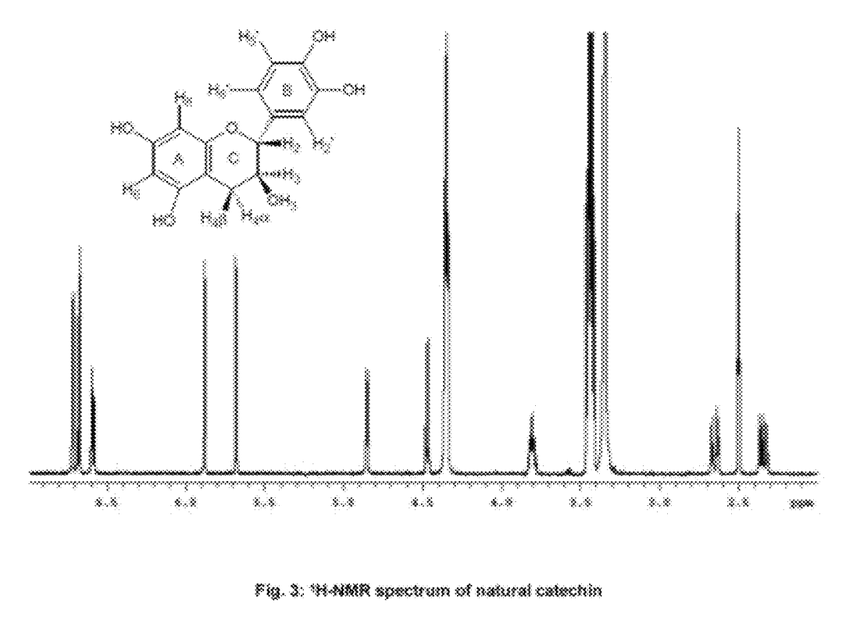
FIG. 3 shows the $^1$H-NMR spectrum of natural catechin.
Figure 4:
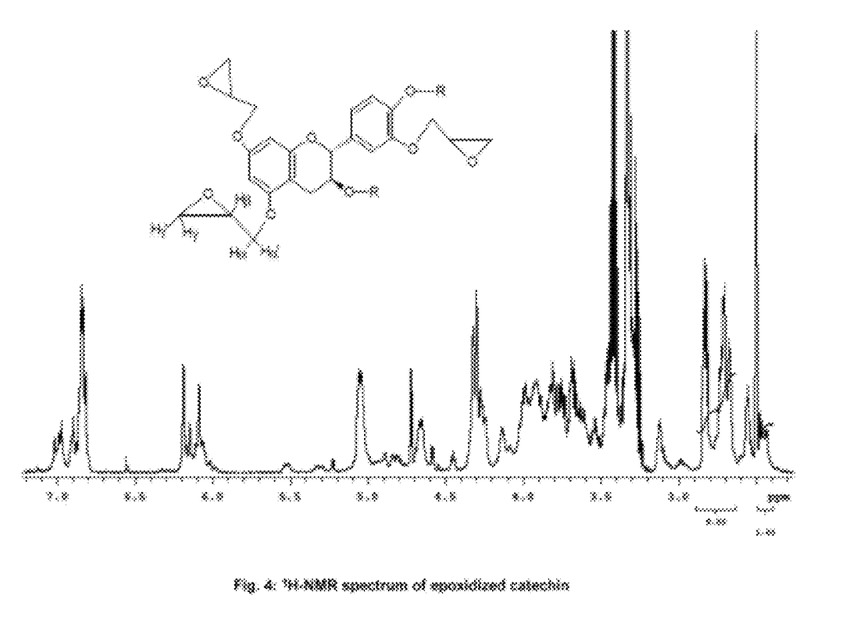
FIG. 4 shows the $^1$H-NMR spectrum of the epoxidized catechin according to Example 1.

By NMR: FIGS. 3, 4 and 5

The $^1$H-NMR spectrum of natural catechin is shown in FIG. 3.

The assignment of the different signals was carried out with the HMBC and HSQC spectra (not shown here).

$^1$H NMR (DMSO) of catechin: δ=2.35 ppm (1H, $CH_{4\beta C}$), 2.65 ppm (1H, $CH_{4\alpha C}$), 3.81 ppm (1H, $CH_{3C}$), 4.47 ppm (1H, $CH_{2C}$), 4.85 (1H, $OH_{3C}$), 5.68 ppm (1H, $CH_{8A}$), 5.88 ppm (1H, $CH_{6A}$), 6.59 ppm (1H, $CH_{6'B}$), 6.70 ppm (2H, $CH_{2'B}$, $CH_{5'B}$).

The $^1$H-NMR spectrum of epoxidized catechin is shown in FIG. 4.

The assignment of the different signals was carried out with HMBC and HSQC spectra (not shown here). The average number of epoxide functions present on the epoxidized catechin molecule was determined by integrating the signals between 2.6 and 2.99 ppm corresponding to the protons γ and γ' of the epoxide functions and of the protons $H_{4\alpha C}$ and by integration of the signal at 2.45 ppm corresponding to the $H_{4\beta C}$ protons. The calculation gives 3.5 epoxide functions on average per molecule of epoxidized catechin.

The $^1$H Dosy spectra of natural catechin and of epoxidized catechin are shown in FIG. 5.

Catechin has a diffusion coefficient around 2 m$^2$/s. Epoxidized catechin has a slightly lower diffusion coefficient (between 1.5 and 2 m$^2$/s) which supports the molar mass difference and therefore epoxidation of the catechin. Further, on spectrum B, neither 2 nor several populations of molecules are distinctly seen, corresponding to epoxidized catechin with distinct diffusion coefficients which shows that one has a distribution of molecules with a variable number of epoxide functions (3, 4 or 5) rather than polymerized epoxidized molecules (dimers, trimers . . . ).

Example 5

Synthesis of an Epoxidized Tannin Extract by Epoxidation of Tannin

A grape pip extract containing 630.84 mg of tannin per gram is weighed (3.15 g of tannin, 9.9.10$^{-3}$ mol of tannin), solubilized in ethanol (10 mL) and introduced into a two-neck 100 mL flask. The epichlorohydrin (15.5 mL, 19.8.10$^{-2}$ mol, Aldrich 240699-100 mL) is introduced into the flask placed with magnetic stirring for a few minutes at 98° C. The reaction mixture is refluxed and an alcoholic soda solution (3.96 g, 9.8.10$^{-2}$ mol) in ethanol (18.8 mL) is added dropwise. The reaction medium is then left with reflux. After 3 hours of reaction, the reaction medium is diluted in acetone (300 mL) and filtered on a filter with glass microfibers (1 µm) in order to remove the formed NaCl. The filtrate is then concentrated in the rotary evaporator in vacuo in order to remove the residual epichlorohydrin. The product is in the form of an oil which is dissolved in acetone (100 mL) again filtered and concentrated in the rotary evaporator in vacuo. The dissolution-filtration-evaporation operation is then repeated one last time.

Example 6

Producing an Epoxy Resin from Epoxidized Catechin and from a Hardener

The resins are formulated at room temperature. The products resulting from epoxidation of catechin are crystalline, their melting temperature determined by DSC is located around 85° C. It is therefore necessary to dilute the products in a solvent (procedure 1) or another epoxidized product with lower viscosity (procedure 2a) or a reactive diluent (procedure 2b):
1) Dissolve 1 g of epoxidized catechin in 200 µL of acetone. In a small mold, mix 0.6 g of this mixture with 0.365 g of Epamine PC 19 (PO.INT.ER s.r.l). The resin forms after several hours at room temperature.
2) a) Dilute 0.8 g of epoxidized catechin in 1.2 g of resorcinol diglycidyl ether (Aldrich 470945-100 mL) at 60° C. for a few minutes. The mixture should be slightly viscous at room temperature. In a small mold, mix 1 g of this mixture with 0.565 g of Epamine PC 19 (PO.INT.ER s.r.l). The resin forms after several hours at room temperature.
    b) Dilute 0.5 g of epoxidized catechin in 1.5 g of DGEBA (Epikote 828 Resolution Performance Products) at 60° C. for a few minutes. The mixture should be slightly viscous at room temperature. In a small mold, mix 1 g of this mixture with 0.598 g of Epamine PC 19 (PO.INT.ER s.r.l). The resin forms after several hours at room temperature.

The obtained resins are characterized by thermogravimetric analysis (TGA) (FIG. 6) and compared with a commercial resin obtained from DGEBA (Epikote 828 Resolution Performance Products) (Resin A).

Figure 6:
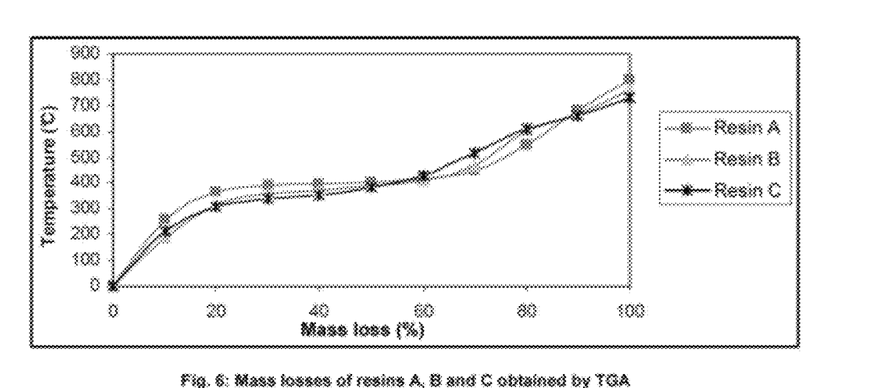
FIG. 6 shows the mass loss profiles by themorgravimetric analysis (TGA) of the resins obtained according to Example 6.

Resin B is a resin produced from epoxidized catechin according to the method ii) by using DGEBA as another epoxidized product with lower viscosity (25% epoxidized catechin/75% DGEBA by mass).

Resin C is a resin produced from epoxidized catechin according to the method ii) by using resorcinol diglycidyl ether as another epoxidized product with lower viscosity (40% by mass of epoxidized catechin/60% by mass of resorcinol diglycidyl ether).

The cross-linking agent for the 3 resins is a cycloaliphatic amine Epamine PC 19 (PO.INT.ER s.r.l).

The mass loss profiles obtained by TGA of the resins A, B and C are similar.

Figure 7:
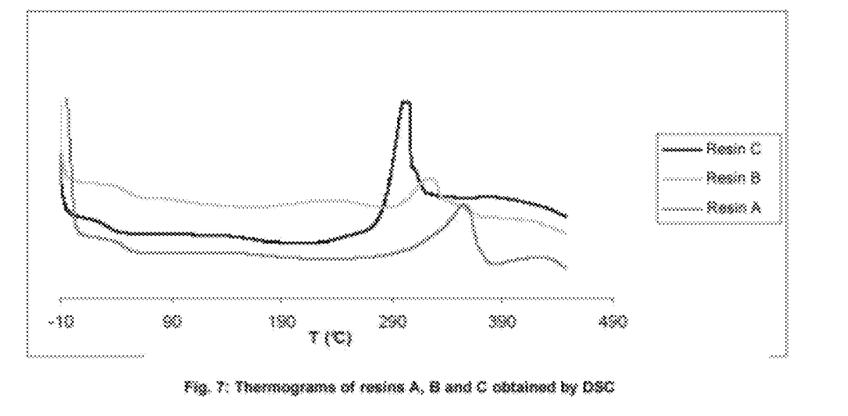
FIG. 7 shows the thermograms by differential scanning calorimetric analysis (DSC) of the resins obtained according to Example 6.
Figure 8:
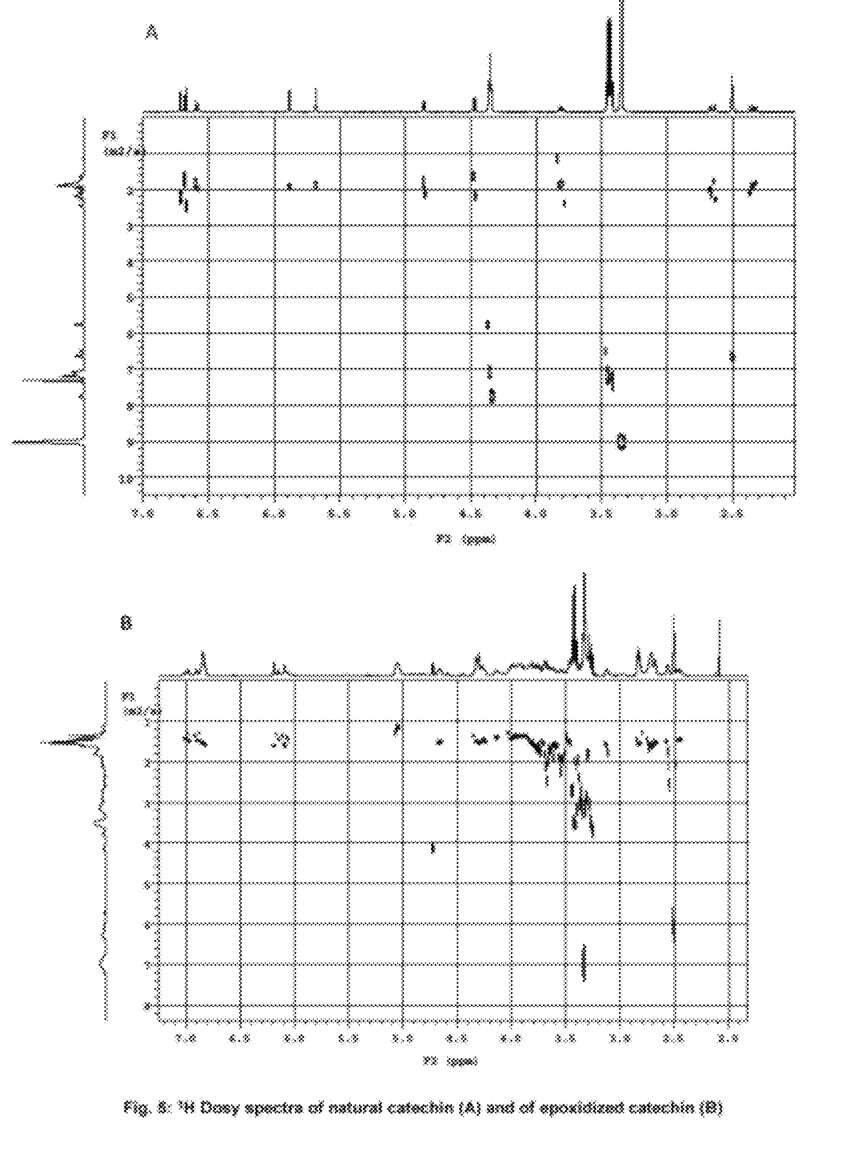

The resins are also characterized by differential scanning calorimetric analysis (DSC) (FIG. 7). The composition of the resins A, B and C is the same as above.

The DSC thermograms consist of a glassy transition (Tg between 30 and 50° C.) and of an exothermic peak towards 300°-400° C. which corresponds to calcinations of the samples. Indeed, when the DSC analysis is stopped at 300° C., the samples are yellow or brown while when the analysis is stopped at 500° C., the samples are calcined. This calcination around 300-400° C. is also visible on the thermograms obtained by TGA by a mass loss in this area from 40 to 50%.

The Tg of the commercial resin (A) and that of the commercial resin containing 25% of epoxidized catechin (B) are the same (Tg(A)=47° C. and Tg(B)=48° C.). The Tg of resin C is 32° C.

On the other hand, calcination occurs at a lower temperature for resins B and C than for resin A.

Example 7

Producing an Epoxy Resin from Epoxidized Tannin and a Hardener

The resins are formulated at room temperature. The products resulting from epoxidation of tannins are crystalline, their melting temperature determined by DSC is located around 130° C. It is therefore necessary to dilute the products in a solvent (procedure 1) or an epoxidized product of lower viscosity (procedure 2a) or a reactive diluent (procedure 2b).
1) Dissolve 1 g of epoxidized tannin in 200 µL of acetone. In a small mold, mix 0.6 g of this mixture with 0.312 g of Epamine PC 19 (PO.INT.ER s.r.l). The resin forms after several hours at room temperature.
2) a) Dilute 0.8 g of epoxidized tannin in 1.2 g of resorcinol diglycidyl ether (Aldrich 470945-100 mL) at 60° C. for a few minutes. The mixture should be slightly viscous at room temperature. In a small mold, mix 1 g of this mixture with 0.651 g of Epamine PC 19 (PO.INT.ER s.r.l). The resin forms after several hours at room temperature.
    b) Dilute 0.5 g of epoxidized tannin in 1.5 g of DGEBA (Epikote 828 Resolution Performance Products) at 60° C. for a few minutes. The mixture should be slightly viscous at room temperature. In a small mold, mix 1 g of this mixture with 0.546 g of Epamine PC 19 (PO.INT.ER s.r.l). The resin forms after several hours at room temperature.

The invention claimed is:
1. A method for preparing epoxy resins from a mixture of epoxidized phenolic compounds, comprising:
    epoxidizing natural phenolic compounds in the presence of an oxirane substituted with at least one chlorine or bromine atom, said natural phenolic compounds being polyphenolic compounds selected from the group consisting of naphthoquinones, stillbenoids, flavonoids, isoflavonoids, anthocyanins, condensed tannins and hydrolyzable tannins, in order to obtain a mixture of epoxidized phenolic compounds.

2. The method according to claim 1, wherein the natural phenolic compounds used for the synthesis of epoxidized phenolic compounds are flavonoid, condensed tannin or hydrolyzable tannin polyphenols.

3. The method according to claim 1, wherein said natural phenolic compounds are extracted:
from wood, or products from forestry,
from freshwater or halophilic algae, or
from vine, grape, fruit or products from wine growing or wine making.

4. The method according to claim 1, wherein the natural phenolic compounds are condensed tannins or hydrolyzable tannins, said method comprising prior to the epoxidation step, a step for depolymerization of said natural phenolic compounds in the presence of acid and of nucleophilic reagents.

5. An epoxy resin which is obtained by the method according to claim 1.

6. The method according to claim 1, wherein the natural phenolic compounds used for the synthesis of epoxidized phenolic compounds are flavonoid polyphenols.

7. The method according to claim 1, wherein the natural phenolic compounds used for the synthesis of epoxidized phenolic compounds are condensed tannin polyphenols.

8. The method according to claim 1, wherein the natural phenolic compounds used for the synthesis of epoxidized phenolic compounds are hydrolyzable tannin polyphenols.

* * * * *